United States Patent Office 3,759,663
Patented Sept. 18, 1973

3,759,663
PROCESS FOR DYEING POLYESTER FABRICS WITH DISAZO DYESTUFFS
Edgar E. Renfrew and Dominic A. Zanella, Lock Haven, Pa., assignors to American Aniline Products, Inc., Lock Haven, Pa.
No Drawing. Continuation-in-part of abandoned application Ser. No. 860,040, Sept. 22, 1969. This application Feb. 28, 1972, Ser. No. 230,143
Int. Cl. D06p 1/02
U.S. Cl. 8—41 C
4 Claims

ABSTRACT OF THE DISCLOSURE

Process for dyeing polyester material, particularly polyethylene terephthalate, with a disazo compound made by coupling an appropriate diazotized aminoazobenzene into an esterified 3-bis(2-hydroxyalkyl)aminoacylanilide, such as 3-bis(hydroxyethyl)amino-4-ethoxyacetanilide. The diazo compounds have the formula

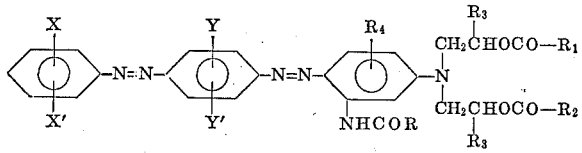

wherein each of X and X' is independently hydrogen, nitro, chloro, cyano, trifluoromethyl, lower alkoxy, sulfamyl, lower alkyl sulfamyl, di(lower alkyl) sulfamyl, lower alkyl sulfonyl, carbamyl, n-lower alkyl carbamyl, or N,N-di(lower alkyl)carbamyl;
each of Y and Y' is independently hydrogen, chloro, lower alkyl, lower alkoxy or —NHCO-(lower alkyl);
R is lower alkyl, phenyl or tolyl;
$R_1$ is phenyl, lower alkylphenyl, lower alkoxyphenyl, chlorophenyl or bromophenyl;
$R_2$ is phenyl, lower alkylphenyl, lower alkoxyphenyl, chlorophenyl, bromophenyl, lower alkyl or chloro-lower alkyl;
$R_3$ is hydrogen or methyl; and
$R_4$ is hydrogen, chloro, lower alkyl or lower alkoxy.

The disazo compounds, when appropriately dispersed, produce dyeings on polyester fabrics with excellent substantivity and sublimation fastness and good fastness to light. They are applied to polyesters by carrier dyeing, pressure dyeing, and thermofixation techniques.

CROSS REFERENCE TO PARENT APPLICATION

This application is a continuation-in-part of our copending application, Ser. No. 860,040, filed Sept. 22, 1969, now abandoned.

BACKGROUND OF THE INVENTION

Recently, considerable attention has been directed to dyes for polyesters which are prepared from appropriate diazo components and tertiary-amine coupling components containing two modified hydroxyalkyl groups attached to the tertiary-aminonitrogen. These dyes have been proven to have good affinity for polyester fabrics under certain conditions, depending on the structure of the particular dye. For example, one such modification involves making the diacetoxy derivative of a tertiary-amino coupling component containing two hydroxyalkyl groups by acylation with acetic acid or acetylchloride as described in Merian, U.S. 3,178,405.

It is known that as the size of these dye molecules is increased by an increase in molecular weight, particularly through the acylation of hydroxyl groups, the effectiveness as a polyester color diminishes readily. Perhaps for this reason, disazo dyestuffs have not been outstanding as polyester colors. It is known that certain disazo orange dyes can be blended in minor proportion with monoazo blues to make blacks; for example, as described by Rotcop and Baumann in U.S. 3,413,075. Disazo dyes of the type used by Rotcop et al. tend to sublime more rapidly than the monoazo blues used in the mixture.

Disazo dyes prepared from a tertiary-amino coupling component containing esterified hydroxyalkyl groups attached to the aminonitrogen are known from McNally et al., U.S. 2,166,466. The dyes of McNally et al. are made from an aminoazobenzene having as part of its structure a $CH_2X$ group (in which X is preferably —OH) attached to the benzene ring positioned in the middle in the final disazo structure. Although these dyes are said to be useful for coloring cellulose organic derivatives and wool, the intermediate containing the $CH_2X$ group required for their preparation is not commercially available and is difficult to prepare.

Toji, U.S. 3,523,936, discloses a series of disazo compounds having an aliphatic diester component. It was found critical by Toji that such compounds, in order to be dyes for polyester, must contain 3″-sulfonamido substituent. Reporting on the results of experimentation with the substitution of a carbonamido substituent in place of the critical 3″-sulfonamido group, Toji found the compounds to be totally unsuitable for the dyeing of polyester. As reported by Toji at Example 34(b), the dyeings "proved unsatisfactory because of heavy nylon stain with washing before and after durable-press. Fastness to rubbing, without durable-press, was poor."

We have now discovered a new class of water-insoluble disazo dyestuffs which have remarkable affinity for polyester fibers and which achieve a build-up on the polyester fabric proportional to the amount of dye applied. The new dyes are also characterized by excellent light and sublimation properties.

SUMMARY OF THE INVENTION

In accordance with a first aspect of the invention there are provided polyester dyeings produced with the novel disazo compounds of the invention.

In accordance with a second aspect of the invention there are provided dyestuffs of the formula

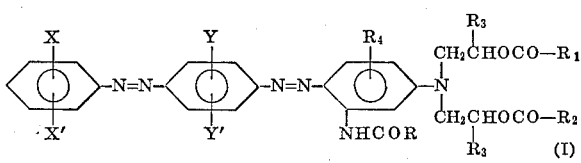

(I)

wherein each of X and X' is independently hydrogen, nitro, chloro, cyano, trifluoromethyl, lower alkoxy, sulfamyl, lower alkyl sulfamyl, di(lower alkyl) sulfamyl, lower alkyl sulfonyl, carbamyl, N-lower alkyl carbamyl, or N,N-di(lower alkyl) carbamyl;
each of Y and Y' is independently hydrogen, chloro, lower alkyl, lower alkoxy of —NHCO-(lower alkyl);
R is lower alkyl, phenyl or tolyl;
$R_1$ is phenyl, lower alkylphenyl, lower alkoxyphenyl, chlorophenyl or bromophenyl;
$R_2$ is phenyl, lower alkylphenyl, lower alkoxyphenyl, chlorophenyl, bromophenyl, lower alkyl or chloro-lower alkyl;
$R_3$ is hydrogen or methyl; and
$R_4$ is hydrogen, chloro, lower alkyl or lower alkoxy.

According to a preferred embodiment of the invention there are provided polyester dyeings with a dyestuff (I) wherein $R_2$ is lower alkyl or chloro-lower alkyl.

According to another preferred embodiment of the invention there are provided polyester dyeings with a dyestuff (I) wherein $R_2$ is phenyl, lower alkylphenyl, lower alkoxyphenyl, chlorophenyl or bromophenyl.

As lower alkyl groups in the dyestuff (I) may be mentioned the linear and branched alkyl groups which preferably contain not greater than six carbon atoms, the methyl, ethyl, n-propyl, iso-propyl, n-butyl, sec-butyl, n-pentyl and n-hexyl groups being exemplary. As lower alkoxy groups may be mentioned the linear and branched alkoxy groups preferably containing not greater than six carbon atoms; exemplary are methoxy, ethoxy, n-propoxy, n-butoxy, iso-butoxy, n-pentyloxy and hexyloxy.

The dyestuffs (I) are made in the conventional manner by adding a diazotized aminoazobenzene to a solution of an appropriate coupling component.

Certain aminoazobenzenes can be made by the rearrangement of diazoamino compounds (or triazenes) by well-established methods. Examples are p-aminoazobenzene and certain aminoazotoluenes. A general way to make aminoazobenzenes is to couple a diazotized aromatic amine into the same or a different primary aromatic amine with an available coupling position. In certain cases, it is desirable to promote the coupling and to protect the primary amine by a group which can be removed by hydrolysis after the coupling. The technique often used is the formation of the anilinomethane-sulfonic acid.

The aminoazobenzene intermediate is diazotized in the usual way by heating it in a concentrated aqueous solution of a strong mineral acid, such as hydrochloric acid, cooling the resulting solution to a temperature of 0–10° C. and adding thereto a quantity of sodium nitrite slightly in excess of the stoichiometric requirement. An alternate method of diazotization involves dissolving sodium nitrite in concentrated sulfuric acid, heating to a temperature of about 60–70° C., cooling the resulting solution to 0–10° C. and adding thereto the aminoazobenzene.

The coupling component is made from a bis(2-hydroxy-lower alkyl amino)acyl anilide by esterification with an aromatic acylating agent, or an aromatic and an aliphatic acylating agent. As an aliphatic acylating agent may be mentioned acetyl chloride, butyryl chloride, propionyl chloride, chloroacetyl chloride, or anhydride thereof. As an aromatic acylating agent may be mentioned benzoyl chloride, o-chlorobenzoyl chloride, p-chlorobenzoyl chloride, anisoyl chloride, tolyl chloride, or an acid derivative thereof such as benzoic anhydride. Mixed esterifying agents can be used as described in the copending application of Dominic A. Zanella, Ser. No. 673,956, filed Oct. 9, 1967.

The dyestuff (I) is made by coupling the diazotized aminoazobenzene with the esterified bis(2-hydroxyamino)-acyl anilide by adding the diazonium salt to a cold aqueous acid solution of the coupler. A buffering agent such as sodium acetate to reduce the acidity to a pH of 5 to 7 is added and the mixture is allowed to react for 8 to 24 hours at room temperature and is thereafter filtered and washed acid free. The desired dyestuff is thus obtained in the form of a wet cake.

To prepare the product for application to the polyester substrates the product must be suitably dispersed. This may, for example, be done in any of several well-known methods, milling as in a ball-mill with dispersing agents such as lignin sulfonic acid materials. The resultant aqueous dispersion is dried, as in a spray-dryer, or preserved and used as a paste. Standardization to any desired lower strength can be accomplished with inert colorless diluents, for example, inorganic salts for powders, or water for pastes. Other materials, such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereinabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye may also be applied to the aromatic polyester fiber by thermofixation methods, such as the "Thermoseal" process. This process involves padding the cloth with a dilute dye dispersion, followed by drying to remove water (e.g., by preheating with infrared heat) and curing by dry heat fixation using dried hot air or heated contact rolls. Curing or fixation temperatures of 350–430° F. are used for less than 2 minutes, usually for 30 to 90 seconds. Ordinarily, if the padded fabric is entirely polyester, curing is done at 400–430° F. If the fabric contains cotton or viscose rayon, apart from synthetic fibers, there is little danger of damaging cellulosic portions, but if wool is present, the curing temperature must be kept below 357° F. and the time must be reduced to about 30 seconds.

For durable press finishing of mixed polyester-cotton blends, after thermofixation the residual unfixed dye is removed from the fabric by scouring and the cleaned fabric is given a durable press cure at 300–350° F.

EXAMPLE I

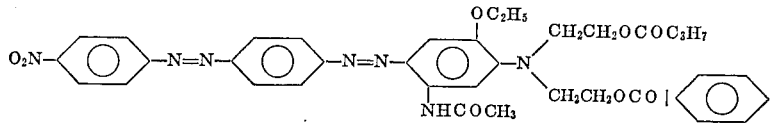

(A) Diazo

A 3000 ml. beaker is charged with 278.4 g. wet cake containing 48.4 g. (0.20 mole) 4-amino-4'-nitroazobenzene, 140.0 g. hydrochloric acid, 32%, 135 ml. hot water and 20.0 g. "Levelene" (a commercially available nonionic surfactant). The mixture is stirred at 75° C. at which temperature most of it is dissolved. Ice is added to bring the temperature to 0° C. At 0–5° C., during one-half hour, a solution of 14.3 g. sodium nitrite in 65 ml. water is dropped in. Stirring is continued for one hour at 0–5° C., and another hour at 5–10° C.; a slight excess of nitrous acid is always present. The excess nitrite is then removed with a little sulfamic acid solution. The diazo solution is neutralized to slight acidity (Congo red test) with 84.0 g. sodium acetate, anhydrous. Then 7.0 g. decolorizing carbon and 7.0 g. diatomaceous earth filtering and are added and the mixture is filtered. The cake is washed with five washes, each 135 ml. ice water, the washings being combined with the filtrate. The solution is preserved cold.

(B) Coupler

To a 500 ml. flask equipped with a stirrer, heater and thermometer is charged 50.0 g. butyric acid and 29.0 g. benzoyl chloride. The mixture is heated to 70° C. and at 70–75° C. during one hour is added 56.4 g. 3'-[bis(2-hydroxyethyl)amino]-p-acetophenetidide (0.2 mole). The mass is stirred at 70–75° C. for two hours, after which it is poured into a beaker containing a mixture made from 600 g. ice, 600 cc. water 40.0 g. hydrochloric acid 32% and 5.0 g. "Tween 20," a non-ionic surfactant suitable for use as an emulsifying or suspending agent.

(C) Coupling

The coupler solution from Part (B) is iced to 0° C.; at 0–5° C. over fifteen minutes is added the cold diazo solution from Part (A). The combination is stirred one hour at 0–5° C., after which it is neutralized to slight acidity to Congo red test paper with 30.0 g. sodium acetate. The mass is stirred for fifteen hours during which time it is allowed to come to room temperature.

The insoluble portion is isolated by filtration and washed on the funnel with water until the washings run nearly neutral. The product is preserved as a wet cake; a dry test indicates a yield of 108.0 g.

(D) Dispersion

An amount of wet cake from Part (C) containing 50.0 g. disazo dye is charged to a ball-mill together with 50.0 g. "Marasperse N-22," a commercially available sodium ligninsulfonate. The water content is adjusted so the amount of disazo material in the paste is 12½%.

Milling is carried on until the dye is satisfactorily dispersed as shown by the rate of flow through a Number 4 Whatman filter paper on a small suction funnel.

Dyeings on polyethylene terephthalate fabrics yield attractive bluish-red hues. The dyeings exhibit excellent resistance to sublimation and to the action of light.

EXAMPLE II

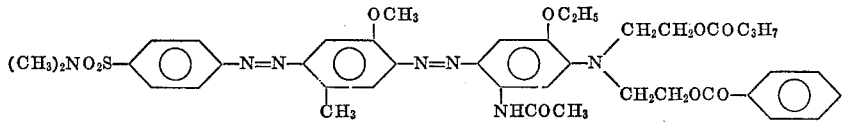

(A) Monoazo base (1) Diazo: To a 3 l. beaker is charged 1000 ml. hot water, 300.0 g. hydrochloric acid, 32% and 200.00 g. N,N'-dimethylsulfanilamide (1.0 mole). The material dissolves after stirring briefly. The solution is iced to 0° C. At this temperature, there is added all at once a solution of 72.0 g. sodium nitrite in 150 ml. water. At the end of one hour, the excess of nitrous acid is removed with sulfamic acid.

(2) Coupling: To and 8 l. bell jar is charged 2000 ml. cold water, 130.0 g. hydrochloric acid, 32% and 137.0 g. cresidine (1.0 mole). The mixture is stirred to dissolve the solids. Ice is then added to bring the temperature to 0.5° C. The diazo solution from Part (A)(1) is added over fifteen minutes. The combination is stirred for sixteen more hours. Enough sodium hydroxide solution 50%, is added to render the mixture alkaline. The solids are collected by filtration and washed free of alkali. The wet cake weighs 2103 g. A dry test indicates the yield to be 342 g.

(B) Disazo dye (1) Diazo: A 3000 ml. beaker is charged with 500 ml. water, 216.0 g. press cake from Part (A)(1) (containing 0.1 mole) 70.0 g. hydrochloric acid, 32% and 10.0 g. "Levelene," a non-ionic surfactant available commercially and useful as a suspending agent. This mixture is heated to 70° C., then allowed to cool while stirring and chilled with an external bath to 5° C. At 5–10° C. is added a solution of 80 g. sodium nitrite in 30 ml. water.

The combination is stirred for three hours, during which time the temperature is allowed to rise to 14° C. The excess nitrous acid is removed with sulfamic acid. About 10 g. of a diatomaceous earth filter aid is then stirred in. The solution is passed through a filter and the residue is washed with about 500 ml. cold water. 42.0 g. sodium acetate is then added. The solution is maintained cold until used in the coupling.

(2) Coupler: A coupler solution of the same strength, but one-half the size of that of Example I, Part (B), is prepared.

(3) Coupling: Coupling is carried out essentially as described in Example I, Part (C). Approximately 20 g. sodium acetate is required for pH adjustment. The weight of disazo dye in the wet cake is 72.0 g.

(4) Dispersion: Milling of paste containing 50.0 g. disazo dye is carried out exactly as described in Example I, Part (D).

Dyeing on polyethylene terephthalate fabrics are reddish-violet in hue, and show excellent properties in tests. Sublimation fastness is excellent at 400° F.

EXAMPLE III

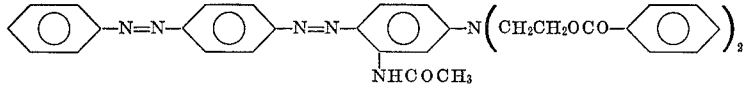

(A) Diazo

A 600 ml. beaker is charged with 350 ml. water, 46.7 g. 4-amino-azobenzene hydrochloride (0.2 mole) and 46.7 g. hydrochloric acid, 32%. The mixture is stirred to uniformity. Ice is then added to reduce the temperature to 0° C. During the two hours, there is dropped in 14.0 g. sodium nitrite in 50 ml. water. During the addition the temperature of the diazotization mixture is maintained at 0–5° C. by adding ice as needed. The mass is stirred two additional hours at 0–5° C. The slight excess of nitrous acid is then removed with a small amount of sulfamic acid solution.

Ten grams diatomaceous earth filter aid is added. The solution is filtered and the filtrate preserved cold.

(B) Coupler

To a 500 ml. flask equipped with a heater, stirrer, reflux condenser and thermometer there is charged 280 g. chlorobenzene and 47.5 g. 3'-[bis(2-hydroxyethyl)amino]acetanilide (0.2 mole). The stirred mixture is heated to 100° C. and at 100–110° C., there is dropped in 57.1 g. benzoyl chloride (0.41 mole). After all has been added, the temperature is slowly brought to boiling (ca. 125° C.) and the mixture is stirred under reflux for one hour, during which time the temperature rises to 130° C.

The charge is cooled to 60° C. and poured into a mixture made of 100 g. ice, 400 g. water and 38.0 g. anhydrous sodium acetate contained in a flask arranged for steam distillation. The chlorobenzene is driven off by distillation with steam. The residue is a tacky solid, which is isolated and then dissolved in 500 ml. acetic acid.

(C) Coupling

The diazonium solution from Part (A) is neutralized to faint acidity on Congo red paper with sodium acetate. It is added over one-half hour to the stirred coupling solution (Part B). Both solutions are maintained at 0–5° C. during the addition as is the combination.

Immediately after the diazonium addition has been completed, a solution of 28.0 g. sodium acetate in 120 ml. water is added dropwise over one hour.

The combination is stirred for sixteen hours, during which time it is allowed to come to ambient temperature. The solid material is collected on a suction filter and washed acid free with cold water. A dry test indicates the yield to be about 70% of the theoretical.

(D) Dispersion

The cake from Part (C) is ball milled with an amount of a commercially available sodium lignin sulfonate ("Marasperse NS") equal to the amount of 100% disazo dyestuff in the cake. Water is adjusted so the final dye paste contains 15% by weight of the disazo product and 15% of dispersing agent.

The dyestuff when applied to polyethylene terephthalate fabric by the usual methods (i.e., carrier, pressure or thermofixation) yields clear yellowish-red dyeings of excellent fastness, especially to sublimation and to light.

EXAMPLE IV

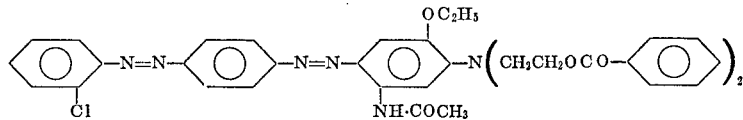

(A) Monoazo base (4-amino-2'-chloroazobenzene)

(1) Diazo: A 2000 ml. beaker is charged with 200 ml. water, 150 g. hydrochloric acid, 32%, and 63.75 g. o-chloroaniline (0.5 mole). The mixture is stirred to complete solution and the solution iced to 0° C. At 0–5° C. during a period of one-half hour, there is dropped into the solution a solution of 70 cc. water and 35.0 g. sodium nitrite. After the addition of the sodium nitrite solution, the mixture is stirred an additional hour at 0–5° C., always keeping an excess of nitrous acid present. At the end of this period, the excess nitrous acid is removed with sulfamic acid. The resulting diazo is a clear solution.

(2) Coupling: There is charged to a 400 c. beaker 1400 ml. water and 103.4 g. anilinomethanesulfonic acid (0.525 mole), 100%. The mixture is stirred to solution.

To the solution is added 80.0 g. anhydrous sodium acetate and the whole is stirred to solution. The coupler solution is iced to 10° C. and to it at 10–12° C., during a period of one hour, is added the previously prepared diazo solution.

The combination is allowed to stir forty hours allowing the temperature to rise to ambience.

(3) Hydrolysis: The reaction mass is neutralized to slight alkalinity to Brilliant Yellow papers with about 70 g. sodium hydroxide solution, 50%. An additional 200 g. sodium hydroxide solution, 50% is then added to the mixture. The mass is heated to 40° C. during one hour; to 60° C. in one hour; to 80° C. in one hour and finally to 90° C. in one hour, and held at 90–95° C. for two hours. The reaction mass is allowed to stir and cool to 25° C. The precipitate is filtered and the cake washed alkali free with cold pater. The cake is then dried. Yield: 99.25 g.=85.5% theoretical.

(B) Disazo dye (1) Diazo: A 1000 ml. 3-neck flask is charged with 200.0 g. sulfuric acid. The acid is cooled to 10° C. by external means and at 10–15° C. is added 14.0 g. sodium nitrite.

After the addition of the sodium nitrite the mixture is heated to 65° C. and then cooled to 5° C. by external means. At 5–10° C. a mixture of 250.0 g. glacial acetic acid and 50.0 g. propionic acid is added dropwise to the nitrosylsulfuric acid solution.

Following the addition of the acetic-propionic acid mixture, 46.3 g. 4 - amino-2'-chloroazobenzene (0.2 mole) (Part A) is added to the mixture at 5–10° C.

The mixture is then stirred two hours at 5–10° C., and at the end of this period, it is poured into a 3000 cc. beaker, containing 1000 g. ice and 500 cc. water. The diazo suspension is neutralized to brown on Congo red paper with 320.0 g. anhydrous sodium acetate and kept cold for the subsequent coupling.

(2) Coupler: A 500 ml. flask equipped with a reflux condenser, a stirrer and a heater is charged with 280.0 g. chlorobenzene and 56.4 g. 3'-[bis(2-hydroxyethyl)amino]-p-acetophenetidide (0.2 mole). The mixture is heated to 100° C. and at 100–110° C., 57.4 g. benzoyl chloride (9.41 mole) is dropped into the stirred mixture. After the addition has been completed, the mixture is slowly heated to the boil (ca. 125° C.) and boiled under reflux for one hour, during which time the temperature rises to 130° C.

The mixture is allowed to cool to 60° C., at which temperature it is poured into a flask equipped for steam distillation containing 400 ml. water, 100 g. ice and 38.0 g. anhydrous sodium acetate (0.46 mole). The chlorobenzene is driven off with steam. The dibenzoate is isolated from the residue as a tacky mass which is then dissolved in 550 g. acetic acid.

(3) Coupling: The diazonium solution from Part (B) (1) is neutralized to faint acidity in Congo red paper with sodium acetate. It is added to the coupler solution Part (B) (2) over one-half hour. Both solutions are maintained at 0–5° C. during the addition.

Immediately after the diazonium addition has been completed, 28.0 g. sodium acetate (anhydrous) is added over one hour. The combination is stirred for sixteen hours during which time it is allowed to come to the temperature of the surroundings.

The solid material is collected on a suction filter and washed free of acid with cold water. A dry test indicates that 75% yield is obtained.

(4) Dispersion: A mixture is made containing 45.0 g. of the disazo compound from Part (B) (3), 45.0 g. of a commercially available sodium ligninsulfonate and 210.0 g. water. It is ball-milled until the dyestuff is dispersed as shown by a conventional speed-of-filtration test.

Dyeings made on polyethylene terephthalate fabrics at several strengths by any of the recognized dyeing methods (as carrier, pressure and thermofixation) are bluish-red in hue; the dye is especially suitable for application by thermofixation methods. Properties are excellent, especially in fastness to sublimation and to light, when tested according to fastness tests established by the American Association of Textile Chemists and Colorists, published in the A.A.T.C.C. Technical Manual, 1968 Edition.

EXAMPLE V

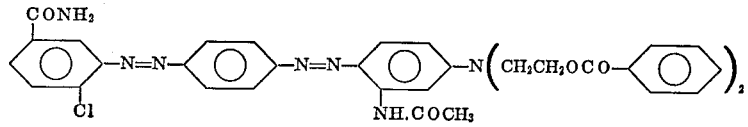

(A) Monazo dye (1) Diazo: A 2000 ml. breaker is charged with 300 cc. water, 150.0 g. hydrochloric acid 32% and 85.3 g. 3-amino-4-chlorobenzamide (0.5 mole). The mixture is stirred to solution and the solution iced to 0° C. At 0–5° C. during a period of one-half hour there is added dropwise a solution of 70 cc. water and 35.0 g. sodium nitrite. The mixture is stirred an additional one hour at 0–5° C., always positive to nitrous acid. At the end of this period, the excess nitrous acid is removed with sulfamic acid.

(2) Coupling: There was charged to a 4000 cc. beaker 1400 cc. water and 103.4 g. 100% anilinomethanesulfonic acid (0.525 mole). The mixture is stirred to solution. To it is added 80.0 g. sodium acetate and the whole is stirred to solution. The coupler solution is iced to 10° C. and to it at 10–15° C. during a period of one hour, is added the diazo solution, Part (A)(1). The mass is allowed to stir allowing the temperature to rise to that of the room. The coupling is complete after twenty-four hours.

(3) Hydrolysis: The reaction mass is neutralized to slight alkalinity to Brilliant Yellow papers with sodium hydroxide solution, 50%.

An additional portion of sodium hydroxide solution, 50% is then added to the mixture. The mass is heated to 40° C. during one hour; to 60° C., in one hour; to 80° C. in one hour and finally to 90° C. in one hour; and held at 90–95° C. for two hours. The reaction mass is allowed to stir and cool to 25° C. The precipitate is filtered and the cake washed alkali free with cold water. The cake is then dried. Yield: 109. g.

(B) Disazo dye (1) Diazo: A 1000 ml. 3-neck flask is charged with 200 g. sulfuric acid, 66° Bé. The acid is cooled to 10° C. by external means and at 10–15° C., 14.0 g. sodium nitrite is added to the acid.

After the addition of the sodium nitrite, the mixture is heated to 65° C. and then cooled to 5° C. by external means. At 5–10° C. a mixture of 250.0 g. glacial acetic acid and 50.0 g. propionic acid is added dropwise to the nitrosylsulfuric acid solution. To the stirred acid is added at 5–10° C. 54.8 g. 3-(p-aminophenylazo)-4-chlorobenzamide (0.2 mole) (Part (A)(3)). The mixture is then stirred 2 hours at 5–10° C. after which it is poured into a 3000 cc. breaker containing 1000 g. ice and 500 cc. water. The diazo suspension is neutralized to brown on Congo red papers with 320.0 g. sodium acetate and kept cold for the subsequent coupling.

(2) Coupler: A coupling solution is prepared in exactly the way described in Example III, Part (B).

(3) Coupling: The solution from Part (B)(1) is added to the solution of Part (B)(2) in the way described in Example 4, (Part (B)(3)).

(4) Dispersion: A ball mill is charged with an amount of wet cake, Part (B)(3) containing 45.0 g. disazo compound 45.0 g. "Marasperse N-22" and an amount of water to bring the total water including that charged with the press cake (B)(3) to 210.0 g. Milling is carried on until the dispersion passes a conventional filter test.

Dyeings on polyethylene terephthalate fabric and yarns are red in hue; when tests on the properties of the dyeings are conducted by methods established by the American Association of Textile Chemists and Colorists, the dyeings have very good properties, with resistance to sublimation being particularly good. The dye is particularly well-suited for dyeing by thermofixation methods.

EXAMPLES VI—XXXIIII

The dyestuffs (I) indicated below are produced by following the procedure of Example I. The dyestuffs (I) below, when dyed on polyethylene terephthalate according to the procedure of Example I, yield dyeings having the hue indicated in the right column of the table:

| Example | X | X' | Y | Y' | R | $R_1$ | $R_2$ | $R_3$ | $R_4$ | Hue on polyethylene terephthalate |
|---|---|---|---|---|---|---|---|---|---|---|
| VI | 4-CH₃O | H | H | H | CH₃ | CH₃ | –C₆H₅ | H | H | Red. |
| VII | 4-SO₂NH₂ | H | H | H | CH₃ | C₂H₅ | Same as above | H | H | Bluish-red. |
| VIII | 4-Br | H | 2'-OCH₃ | 5'-NHCOCH₃ | CH₃ | C₂H₅ | do | H | H | Plum. |
| IX | 3-NO₂ | H | H | H | CH₃ | CH₂Cl | do | H | H | Bluish-red. |
| X | 3-CF₃ | H | H | H | CH₃ | CH₃ | do | H | H | Red. |
| XI | H | H | 2'-OCH₃ | H | CH₃ | –C₆H₄Cl | | H | H | Red. |
| XII | 4-SO₂CH₃ | H | H | H | CH₃ | –C₆H₄CH₃ | | H | H | Red. |
| XIII | 4-CN | H | H | H | CH₃ | –C₆H₄OCH₃ | | H | Cl | Red. |
| XIV | 4-NO₂ | 2-Cl | H | H | CH₃ | CH₃ | –C₆H₄Cl | CH₃ | 6''-OC₄H₆ | Navy blue. |
| XV | 4-NO₂ | 2-OCH₃ | H | H | C₃H₇ | CH₃ | –C₆H₄Br | CH₃ | H | Bordeaux. |

| Example | X | X' | Y | Y' | R | R₁ | R₂ | R₃ | R₄ | Hue on polyethylene terephthalate |
|---|---|---|---|---|---|---|---|---|---|---|
| XVI | 4-NO₂ | 2-Cl | 3'-NHCOCH₃ | H | CH₃ | C₂H₅ | —C₆H₅ | H | 6''-CH₃ | Bluish-violet. |
| XVII | 2-Cl | H | 3'-Cl | H | —C₆H₅ | CH₃ | Same as above | H | H | Red. |
| XVIII | 4-NO₂ | H | H | H | Same as above | CH₃ | do | H | 6''-OCH₃ | Blue. |
| XIX | 4-NO₂ | H | 2'-OCH₃ | 5'-CH₃ | —C₆H₄—CH₃ | CH₃ | —C₆H₄—Cl | H | 6''-OCH₃ | Blue-Black. |
| XX | 4-OCH₃ | 2-OCH₃ | H | H | C₂H₅ | C₂H₅ | Same as above | H | 6''-OC₂H₅ | Blue. |
| XXI | 4-NO₂ | H | H | H | CH₃Cl | C₄H₉ | do | H | 6''-OCH₃ | Do. |
| XXII | 3-CONHC₄H₉ | H | 2'-OC₂H₅ | H | CH₃ | —CH₆ | —C₆H₄—Br | H | 6''-OCH₃ | Violet. |
| XXIII | 4-SO₂N(CH₃)₂ | H | H | H | CH₃ | CH₃ | —C₆H₄—OC₂H₅ | H | H | Red. |
| XXIV | 4-SO₂NHC₂H₅ | H | H | 5'-CH₃ | C₂H₅ | C₂H₅ | —C₆H₄—CH₃ | H | H | Bluish-red. |
| XXV | 4-CON(CH₃) | H | 2'-OCH₃ | H | —C₆H₄—CH₃ | CH₃ | CH₃ | H | H | Red. |
| XXVI | H | H | H | H | CH₃ | —C₆H₄—Cl | CH₃ | H | H | Yellowish-red. |
| XXVII | H | H | 3'-CH₃ | H | CH₃ | —C₆H₄—OCH₃ | CH₃ | H | H | Red. |
| XXVIII | 2-Cl | H | H | H | CH₃ | —C₆H₄—Br | CH₃ | H | H | Red. |
| XXIX | H | H | H | H | CH₃ | —C₆H₄—CH₃ | CH₃ | H | H | Yellowish red. |
| XXX | 4-NO₂ | H | H | H | CH₃ | Same as above | CH₃ | H | H | Bluish red. |
| XXXI | 2-Cl | H | H | H | CH₃ | do | CH₃ | H | H | Red. |
| XXXII | 4-OCH₃ | H | H | H | CH₃ | do | C₃H₇ | H | H | Red. |
| XXXIII | 2-Cl | H | 2'-OCH₃ | 5-CH₃ | CH₃ | do | H | H | H | Bluish red. |

The claims:
1. Polyester dyed with a compound of the formula

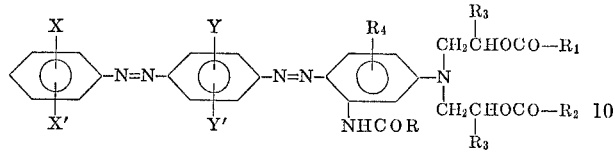

wherein
each of X and X' is independently hydrogen, nitro, chloro, cyano, trifluoromethyl lower alkoxy, sulfamyl, lower alkyl sulfamyl, di(lower alkyl)sulfamyl, lower alkyl sulfonyl, carbamyl, N-lower alkyl carbamyl, or N,N-di(lower alkyl)carbamyl;
each of Y and Y' is independently hydrogen, chloro, lower alkyl, lower alkoxy or —NHCO-(lower alkyl);
R is lower alkyl, phenyl or tolyl;
$R_1$ is phenyl, lower alkylphenyl, lower alkoxyphenyl, chlorophenyl or bromophenyl;
$R_2$ is phenyl, lower alkylphenyl, lower alkoxyphenyl, chlorophenyl, bromophenyl, lower alkyl or chloro-lower alkyl;
$R_3$ is hydrogen or methyl; and
$R_4$ is hydrogen, chloro, lower alkyl or lower alkoxy.

2. Polyester of claim 1 wherein $R_2$ is lower alkyl or chloro-lower alkyl.

3. Polyester of claim 1 wherein $R_2$ is phenyl, lower alkylphenyl, lower alkoxyphenyl, chlorophenyl or bromophenyl.

4. In the method of dyeing polyester fabric materials, the improvement which comprises using as a dyestuff for said polyester fabric material a compound of the formula

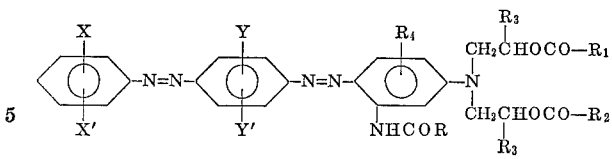

wherein
each of X and X' is independently hydrogen, nitro, chloro, cyano, trifluoromethyl, lower alkoxy, sulfamyl, lower alkyl sulfamyl, di(lower alkyl) sulfamyl, lower alkyl sulfonyl, carbamyl, N-lower alkyl carbamyl, or N,N-di(lower alkyl)carbamyl;
each of Y and Y' is independently hydrogen, chloro, lower alkyl, lower alkoxy or —NHCO-(lower alkyl);
R is lower alkyl, phenyl or tolyl;
$R_1$ is phenyl, lower alkylphenyl, lower alkoxyphenyl, chlorophenyl or bromophenyl;
$R_2$ is phenyl, lower alkylphenyl, lower alkoxyphenyl, chlorophenyl, bromophenyl, lower alkyl or chloro-lower alkyl;
$R_3$ is hydrogen or methyl; and
$R_4$ is hydrogen, chloro, lower alkyl or lower alkoxy.

References Cited
UNITED STATES PATENTS

| | | | |
|---|---|---|---|
| 3,445,454 | 5/1969 | Fishwick | 260—205 |
| 3,523,936 | 8/1970 | Toji | 260—187 |
| 3,653,800 | 4/1972 | Blackwell | 8—21 C |
| 3,667,897 | 6/1972 | Blackwell | 8—41 C |
| 3,678,028 | 7/1972 | Blackwell | 260—186 |
| 3,712,882 | 1/1973 | Blackwell et al. | 260—187 |

LEON D. ROSDOL, Primary Examiner

T. J. HERBERT, Jr., Assistant Examiner

U.S. Cl. X.R.
260—187